(12) United States Patent
Rangan et al.

(10) Patent No.: US 8,171,393 B2
(45) Date of Patent: May 1, 2012

(54) METHOD AND SYSTEM FOR PRODUCING AND ORGANIZING ELECTRONICALLY STORED INFORMATION

(75) Inventors: Venkat Rangan, San Jose, CA (US); Anurag Kashyap, Union City, CA (US); Prem Kumar, Sunnyvale, CA (US); Malay Desai, Fremont, CA (US)

(73) Assignee: Clearwell Systems, Inc., Mountain View, CA (US)

( * ) Notice: Subject to any disclaimer, the term of this patent is extended or adjusted under 35 U.S.C. 154(b) by 1024 days.

(21) Appl. No.: 12/104,297

(22) Filed: Apr. 16, 2008

(65) Prior Publication Data

US 2009/0265609 A1 Oct. 22, 2009

(51) Int. Cl.
*G06F 17/00* (2006.01)
(52) U.S. Cl. .......................... 715/230; 715/229; 715/277
(58) Field of Classification Search .......... 715/229–233, 715/254–256, 277, 206, 209, 775–777, 853
See application file for complete search history.

(56) References Cited

U.S. PATENT DOCUMENTS

| | | | | |
|---|---|---|---|---|
| 6,560,620 | B1 * | 5/2003 | Ching | 715/229 |
| 6,582,474 | B2 * | 6/2003 | LaMarca et al. | 715/234 |
| 7,007,067 | B1 | 2/2006 | Azvine et al. | |
| 7,260,773 | B2 * | 8/2007 | Zernik | 715/229 |
| 7,421,690 | B2 | 9/2008 | Forstall et al. | |
| 7,757,162 | B2 * | 7/2010 | Barrus et al. | 715/230 |
| 7,813,915 | B2 * | 10/2010 | Nakao | 704/9 |
| 7,865,815 | B2 * | 1/2011 | Albornoz et al. | 715/229 |
| 7,885,955 | B2 * | 2/2011 | Hull et al. | 707/722 |
| 7,949,938 | B2 * | 5/2011 | Champion et al. | 715/229 |
| 2002/0078158 | A1 | 6/2002 | Brown et al. | |
| 2003/0023435 | A1 | 1/2003 | Josephson | |
| 2003/0028580 | A1 | 2/2003 | Kucherawy | |
| 2003/0051214 | A1 * | 3/2003 | Graham et al. | 715/512 |
| 2003/0195937 | A1 | 10/2003 | Kircher et al. | |
| 2004/0088332 | A1 * | 5/2004 | Lee et al. | 707/200 |
| 2004/0221295 | A1 | 11/2004 | Kawai et al. | |
| 2004/0261016 | A1 * | 12/2004 | Glass et al. | 715/512 |
| 2005/0055359 | A1 | 3/2005 | Kawai et al. | |
| 2005/0097321 | A1 | 5/2005 | Zhu et al. | |
| 2005/0223061 | A1 | 10/2005 | Auerbach et al. | |
| 2006/0031373 | A1 | 2/2006 | Werner et al. | |
| 2006/0083357 | A1 | 4/2006 | Howell et al. | |
| 2006/0083358 | A1 | 4/2006 | Fong et al. | |
| 2006/0242243 | A1 | 10/2006 | Matsumoto | |
| 2007/0083598 | A1 | 4/2007 | Kawakami et al. | |
| 2007/0106729 | A1 | 5/2007 | Adams et al. | |
| 2007/0150802 | A1 * | 6/2007 | Wan et al. | 715/512 |
| 2007/0157287 | A1 | 7/2007 | Lim | |

OTHER PUBLICATIONS

Bernard, Kerr, Thread Arcs: An email Thread Visualization, Collaborative User Experience Group IBM Research, 2003. Maryam Samiei, EzMail: Using Information Visualization Techniques to Help Manage Email, School of Engineering Science Simon Fraser University, 2004.
Stephen Wan, Generating Overview Summeries of Ongoing Email Discussions, Department of Computing Macquarine University, 2004.
Yejun Wu, Indexing emails and email threads for retrieval, College on Information Studies and UMIACS University of Maryland, 2005.

* cited by examiner

*Primary Examiner* — William Bashore
*Assistant Examiner* — Andrew Tank
(74) *Attorney, Agent, or Firm* — Lowenstein Sandler PC (57) ABSTRACT

The invention provides techniques for efficiently organizing and reviewing electronic documents to be produced in the course of a discovery process. The technique provides for marking the master or pivot document with review information, and identifying a plurality of duplicate documents related to the master or pivot document. The technique provides for reviewing a master or pivot document and propagating the review information to a set of related documents. The technique provides for producing a plurality of electronic documents where each of the electronic documents is marked up in accordance with the review information. The method provides for organizing the plurality of electronic documents so it can be presented and searched in an efficient manner.

25 Claims, 10 Drawing Sheets

Review Stage

De-duplication Stage

Fig. 3

Review Stage

Re-duplication of Review Data

Re-duplication Stage

METHOD AND SYSTEM FOR PRODUCING AND ORGANIZING ELECTRONICALLY STORED INFORMATION

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to producing and organizing electronically stored information, and more specifically to more efficiently producing and organizing electronically stored information in an e-discovery process.

E-discovery refers to a process in which electronic data is sought, located, secured, and searched with the intent of using it as evidence in litigation. E-discovery can be carried out offline on a particular computer or it can be carried out on-line where the electronic data can be accessed through a network.

Due to the rising pervasive use of electronic documents in organizations and the relative ease by which electronic documents are handled, there has been a major push to enable e-discovery in standard litigation practices. The nature of modern digital data makes digital documents extremely well-suited to investigation. Compared to paper-based documents, digital data can be searched with relative ease. Digital data is also relatively difficult to destroy. This arises because electronic documents are typically scattered and stored throughout a network during their normal usage. Standard workflow usually dictate that electronic documents are routinely duplicated and spread through out multiple hard drives and computer systems.

In general, electronic data of all types can serve as evidence in the e-discovery process. Standard discoverable electronic data include texts, images, calendar and schedule data, audio files, spreadsheets, animation files, databases, web site archives, even computer programs such as viruses and the signatures they may leave behind. In a modern corporate setting, electronic mail (e-mail) and recording voicemails are becoming an especially valuable source of data.

A problem with processing electronic documents in an e-discovery process involves dealing with the large amount of data. The very same characteristics that make electronic documents robust and durable—the extent by which electronic documents are routinely duplicated and distributed—are the same characteristics that make electronic documents difficult to process. In the electronic data arena, any one electronic document is almost always duplicated many times over and spread throughout various repositories. This duplicity adds an additional layer of challenge would be reviewers must sort through.

Some of the duplicates are exact-duplicates; others are near-duplicates. Examples of exact-duplicates include exact copies of a file kept in several locations by several users. The near-duplicate files range from almost identical files to slightly altered files to files corresponding to completely different formats. Examples of almost identical files include copies of files that are almost identical except for perhaps their metadata. When a document is attached to an email and sent to a person, the document saved by the recipient is identical to the sender's document except the files may specify different creation or modification dates. Examples of slightly altered files include two copies of an email, one original copy, and one forwarded to another person. In this case, the forwarded email may contain much of the same content as the original except for minor formatting changes and perhaps the addition of a new header and some description text. Examples of files in completely different formats is a document saved in word format and the same document saved in pdf format.

As can be seen from the above, because of the volume of electronic data and the duplicity of many electronic documents, organizing and processing electronic data can be a time intensive process. As the cost of litigation continues their dramatic increase, and as the cost related to the discovery of electronic documents remains a major component of litigation costs, there is a need for a method and system for more effectively organizing and processing electronically stored information.

BRIEF SUMMARY OF THE INVENTION

The present invention relates generally to producing and organizing electronically stored information, and more specifically to more efficiently producing and organizing electronically stored information in an e-discovery process.

According to an embodiment, the invention provides techniques for efficiently organizing and reviewing electronic documents to be produced in the course of a discovery process. The technique provides for marking the master or pivot document with review information, and identifying a plurality of duplicate documents related to the master or pivot document. The technique provides for reviewing a master or pivot document and propagating the review information to a set of related documents. The technique provides for producing a plurality of electronic documents where each of the electronic documents is marked up in accordance with the review information. The method provides for organizing the plurality of electronic documents so it can be presented and searched in an efficient manner.

As part of the process, a set of related documents from a set of electronically stored information is identified. A pivot document for the set of related documents is then selected from the set of related documents. The set of related documents can be categorized into a set of near-duplicate documents and a set of exact-duplicate documents.

Review information including comment information, annotation information, tag information, and redaction information can then be associated with the pivot document. Comment information can include information such as "this is the CEO's memo." Annotation information can include graphics information such as a competitor's trademark and a comment subscribed next to it commenting "see the distinct difference between the competitor's logo and company XYZ's logo." Tag information can include any of several predefined tags such as "responsive" and "non-responsive." Redaction information specifies sections of the document to redact from view in the produced document.

The review information from the pivot document is then propagated to one or more documents in the set of related documents. According to an embodiment, as part of the propagation process, review information is associated with the one or more documents in the set of related documents. When the documents are finally produced, the technique provides for marking up each of the one or more documents in accordance with the review information.

According to an embodiment, the technique provides for identifying one or more other documents from the set of related documents besides the pivot or master document. An additional review information is then associated with the one or more other documents. The review information is not propagated. When it is time to present the produced documents, only the one or more other documents are marked up in accordance with the additional review information associated with the one or more other documents.

According to an embodiment, the technique provides for organizing the set of related documents in accordance with the review information. The set of related documents can be adapted to be navigated in accordance to the review information. In one example, the documents can be navigated through a tree structure where the nodes of the trees are the tags and the leaves of the trees are the documents. The documents can also be made searchable according to information in the review information. In one example, a search for documents that are tagged "responsive" and "marketing documents issued October 2007" will return a list of documents that reviewers have marked to be part of "marketing documents issued October 2007" and "responsive" to the current discovery request. The technique provides for producing the electronically the electronically stored information organized in the above manner to an opposing counsel.

The foregoing, together with other features, embodiments, and advantages of the present invention, will become more apparent when referring to the following specification, claims, and accompanying drawings.

DETAILED DESCRIPTION OF THE INVENTION

The present invention relates generally to producing and organizing electronically stored information, and more specifically to more efficiently producing and organizing electronically stored information in an e-discovery process.

According to an embodiment, the invention provides for techniques for an attorney or legal investigator to use an electronic system to select, review, and produce a set of electronic documents for litigation purposes. The invention is, according to the embodiment, related to electronic discovery (e-discovery) in response to litigation. Discovery typically requires analyzing electronically stored information (ESI) for each of the original possessors of the electronic stored information (custodians). According to the embodiment, typically, one or more of the same or similar documents are found among many custodians. Each of these documents needs to be reviewed prior to producing a set of responsive documents to the opposing party.

Reviewing electronic information in response to litigation, especially document sets that include emails, is an expensive proposition. The costs associated with the process can be high due not just to the tremendous volume of information but also due to the redundancy and duplicity of the information. Often, several independent reviewers must be hired to review information that has been duplicated many times. Additional costs will be incurred in the process to reconcile the reviewed documents generated by the independent reviewers.

A set of electronic document being discovered is often initially organized by the original possessors (custodians). There are a lot of duplicity of documents between spread amongst custodians. For example, when one send out an email of attachments, the attachments can be replicated many times for each user. Even for each user, various versions of a document can be saved. A document may be backed up. A same document can also be saved in different formats—one in word, one in excel, and one in pdf, for example.

An embodiment of the invention includes techniques to reduce review costs by allowing reviewers to review the fewest documents. According to an embodiment, the technique includes allowing a master document to be reviewed and associating a primary review information with the master document. The technique includes associating the master document with a plurality of duplicate documents. The technique includes allowing any of the plurality of duplicate documents to be reviewed and associating a plurality of secondary review information with the plurality of duplicate documents as necessary. The technique includes propagating the review information to the plurality of duplicate documents.

The technique includes marking the master document with review information, and identifying a plurality of duplicate documents associated with the master document and propagating the review information to the plurality of duplicate documents. According to an embodiment, the review information can include one of several type of review content including comment information, annotation information, tag information, and redaction information. Broadly speaking, review content may include basic text (i.e. comment information), rich text, graphics, audio, and other types of data. The review content can include redacted information adapted to specify how the contents of documents should be reacted or hidden.

According to an embodiment, the electronic documents can be organized by information specified in the review information. For example, all documents tagged as relevant to the deal negotiations of Oct. 15, 2007 can be grouped together according to one specific embodiment. The technique also includes enabling the produced electronic documents to be searched by information specified in the review information.

For example, a search for all documents related to deal negotiations of Oct. 15, 2007 will return a set of documents tagged as relevant to the deal negotiations of Oct. 15, 2007.

In the following description, for the purposes of explanation, specific details of embodiments are set forth in order to provide a thorough understanding of the invention. However, it will be apparent that the invention may be practiced without necessarily these specific details.

Figure 1:
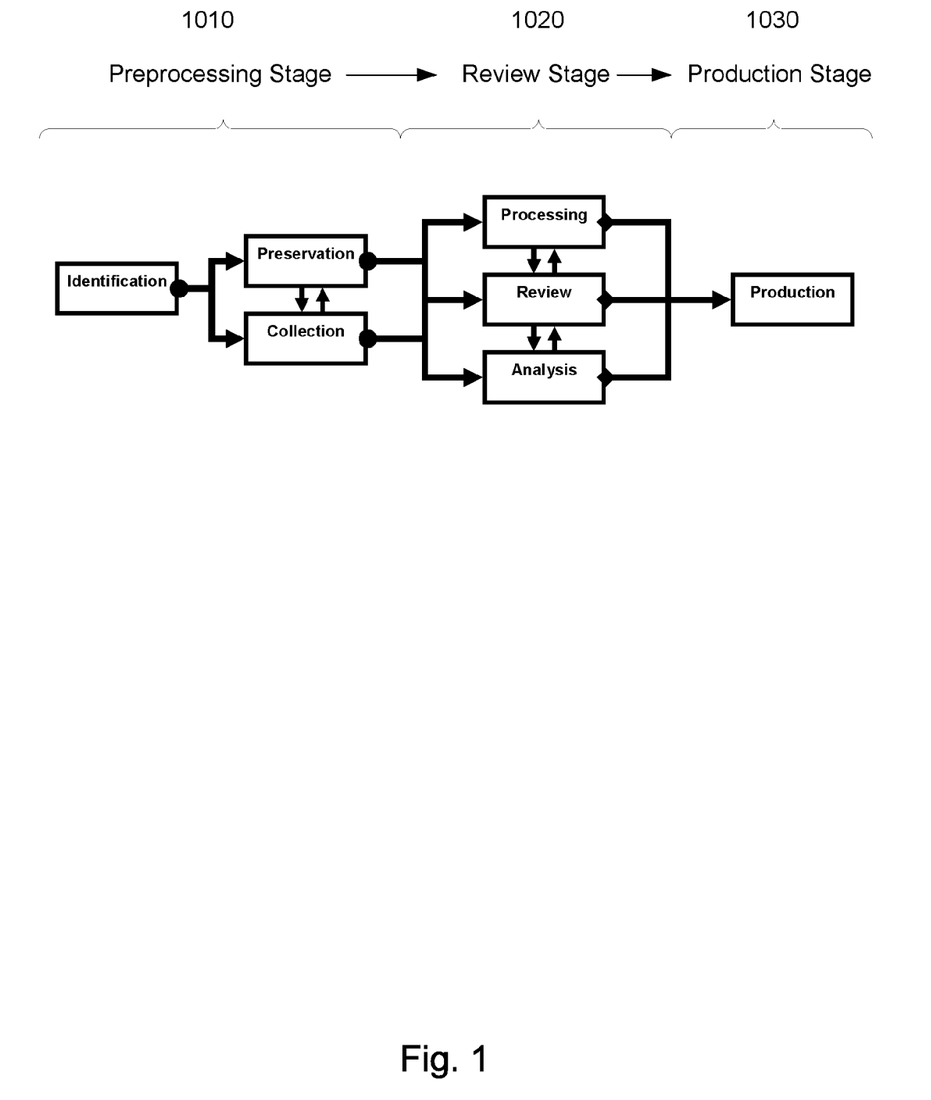
FIG. 1 is a simplified illustration of an electronic discovery process workflow.

FIG. 1 is a simplified illustration of an electronic discovery process workflow. The workflow depicts an embodiment of an electronic discovery reference model that includes a pre-processing stage 1010, a review stage 1020, and a production stage 1030.

Within pre-processing stage 1010, the scope, breadth and depth of electronically stored documents are determined. Custodians—defined as persons or entities that own or control access to a set of electronic documents within an enterprise—are identified. (In general, custodians can be any person who has Read and Write access to electronically stored information (ESI) during the course of normal operational activity.) A large pool of potentially discoverable electronically stored information is identified. Depending on the specific situations, the scope of discoverable information may be influenced by the claims and defenses asserted, preservation demands filed, and specific documents requested for in the disclosure and discovery demands.

In general, during pending litigation, an enterprise may be obliged to identify all custodians and source locations where ESI are likely present. Source locations, in this context, may refer to locations where ESI is present. In enterprise environments, this can refer to, for example, shared email stores (such as central email servers), personal email stores (such as Microsoft Outlook PST files), network file shares, shared portals (such as Microsoft SharePoint) and local files and data in desktop and laptop hard drives of computer devices.

As depicted in FIG. 1, in addition to a step for identifying the documents to be collected, pre-processing stage 1010 can also include a step for collecting ESI and a step for preserving ESI. The collection step includes collecting data previously identified. To maintain and prove integrity, data can be collected and preserved in the original native form and subsequently preserved within an eye toward content integrity. Depending on the specific embodiments, both content data as well as meta-data for the contents, such as the owner, last access time, last modified time and external name of the content data, can all be collected and preserved.

Part of the responsibilities in responding to a discovery request is a duty to preserve electronic data that exist implicitly or that can be explicitly stated by a legal order to preserve data pending a trial. A blanket preservation order can be extremely disruptive for normal operation of a business, however. On the one hand, businesses face the risk of data spoliation and sanctions that can result if it did deemed not to have carried out its responsibilities. On the other hand, businesses must also manage the risks of spoliation and sanctions against the real costs of interruptions that preservation demand on businesses.

In the pre-processing stage, attorneys and legal teams are often deeply involved in preparing relevant files for review. An efficient process is necessary because these processes need to be performed in a manner that is consistent with to clients' legal obligations but that is also appropriately cost-effective and expedient for the client.

As depicted in FIG. 1, following preprocessing stage 1010 in an exemplary workflow is a review stage 1020. During review stage 1020, a group of reviewers collaborate to identify and categorize a set of review documents (i.e. review set).

In course of the process, each of the set of documents can be identified and categorized (through tags) as non-responsive documents, responsive documents, privileged documents, work-product related, or confidential—as an example. The reviewers may also redact portions of documents that are deemed confidential so they are not visible in the final version of documents produced to an opposing party. In addition to tagging and redacting, reviewers may in addition also associate with documents comments (e.g., text information) and annotations (e.g., other types of information such as graphics, labels, etc.).

During review stage 1020, analysis may be taken over the collection of electronic discovery materials (review set) to create relevant summary information, such as key topics of the case, important people, specific vocabulary and jargon, and important individual documents. This information should be provided early since they can be useful to help with strategic and tactical decisions that are need to be made throughout the litigation process. The information is important also to improve the productivity of the rest of the remaining electronic discovery activities. In general, analysis can be performed continually throughout the remainder of the process as new information is uncovered and issues of the case evolve.

As depicted in FIG. 1, an exemplary workflow also includes a production stage 1030. In this final stage of the discovery process, electronically stored information may be delivered to various recipients representing an opposing party, including law firms, corporate legal departments, service providers, etc. Production can involve delivering electronically stored information for use in other systems including automated litigation support system, web-based repository, etc. Production can also involve delivering electronically stored information on various media including CD, DVD, tape, hard drive, portable storage device, paper, other.

According to an embodiment, although this stage comes last in this list, it can be thought of as the first. It is the stage that ultimately drive the entire e-discovery process. Considerations of how one can most effectively present the electronically stored information at depositions, hearings and trial can influence and drive the production stage. If, for example, one wants a key witness to walk though a live spreadsheet at trial, one should probably not have produced the file only in paper form.

Figure 2:
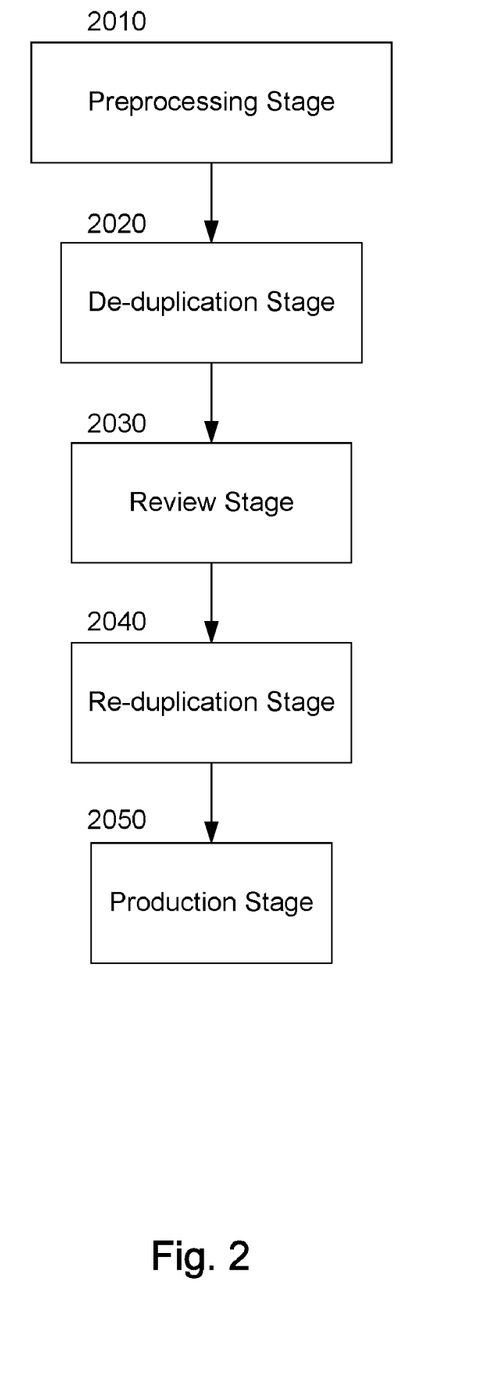
FIG. 2 is a simplified flow diagram illustrating an e-discovery workflow according to an embodiment of the invention.

FIG. 2 is a simplified flow diagram illustrating an e-discovery workflow according to an embodiment of the invention. An exemplary technique includes a step 2010 for pre-processing electronically stored information, a step 2020 for de-duplicating related documents, a step 2030 for reviewing the de-duplicated documents, a step 2040 for re-duplicating the review documents, and a step 2050 for delivering a marked up sets of documents for production.

Pre-processing (2010) includes, according to an embodiment, steps for identifying, collecting, and preserving electronically stored information. A goal of the step is to determine the scope, breadth and depth of electronically stored documents. To maintain and prove integrity, the step also involve collecting and preserving both content data as well as meta-data, including the owner, last access time, last modified time and external name of the content data. Depending on the embodiment, a unique hash value of the content using an MD5 or SHA1 hashing algorithm may be computed and placed as a wrapper to store and preserve the data.

De-duplication (2020) is the process by which a set of related documents is identified and organized. According to an embodiment, a set of related documents may be organized into a set exact-duplicate documents and a set of near-duplicate documents. A set of exact-duplicate documents may represent a set of exact binary copies of an electronic documents. Exact-duplicate documents may share the same contents but may not necessarily share the same meta information. For example, two copies of a file uploaded to an ftp server may have identical names and content information but different creation dates—and may be considered to be exact duplicates according to certain embodiments.

According to another embodiment, two documents with the same contents but different meta information—such as file modification dates, file creation dates, and file descriptions—are not considered exact duplicates but may be considered to be a part of a near-duplicate set of documents. According to another embodiment, if a document has undergone small edits between versions, the various versions can also be considered to be another set of near-duplicate documents. According to yet another embodiment, if a document that has been saved in various formats—for example, one in word, one in pdf, one in txt, one as part of the text of an email—all the files in the different file formats may also be considered to be another set of near-duplicate documents.

In de-duplication stage 2020, as part of the process to identify and organize a set of related documents, a master or pivot document is also identified among the set of related documents. With the identification of a master or pivot document, it becomes no longer necessary to review every copy of the set of related documents. In most cases, only one representative document—the master or pivot document—needs to be reviewed.

After de-duplication step 2020 has been accomplished, a step 2030 for reviewing electronic stored information (ESI) can be carried out. According to an embodiment, a reviewer may review each documents in ESI by adding and associating review content to that document. A reviewer may add comments by typing texts to be associated with the documents, for example. The reviewer may annotate documents by associating the document with further annotation information (by associating information such as a signature or a graphics information). The reviewer may mark or organize the documents by linking one of various tags with the documents. The reviewer also redact confidential or non-relevant portions of the documents by adding and associating redacting information with the document.

As alluded to above, in general, a single document can be reviewed by any of several types of information. For example, one type of information relate to comments and annotations, which may be created by a reviewer and associated with a document. Comments and annotations can represent text and binary information, according to an embodiment. An example of comment information is a note such as "this is an important email." An example of annotation information may be an image such as that of a signature of a reviewer.

In addition to comments and annotations, tag information may be associated with a set of documents to group the set of related documents. According to an embodiment, tags can be a set of labels. An example of tags can include "privileged," "not-responsive, " "responsive" or "confidential." A document can be marked with one or more of these tags. For example, a document of a credit card receipt may be marked "confidential." A document of an email in which a CEO attached an architect design of a new factory plan can be labeled with both "responsive" and "needs-further-review" tags.

One way by which the set of electronic documents to review (review set) can be organized is by the original possessors (custodians) of the original set of electronic documents. The plurality of electronic review documents can also be organized by information specified in the review content. For example, all documents tagged as relevant to the deal negotiations of Oct. 15, 2007 can be grouped together as documents related to deal negotiations of Oct. 15, 2007 when produced. The method can also include enabling the produced electronic documents to be searched by information specified in the review information. The produced documents may be organized such that a search for deal negotiations of Oct. 15, 2007 will result in a set of documents tagged with this information. Other types of tag information may include, for example, marketing releases. As an example, all documents tagged as marketing releases is later organized under the category "marketing releases" and searchable under the keyword "marketing releases."

According to another embodiment, redacting information may also be associated with electronic documents. Reacting is often necessary as part of the discovery process. A document may need to be produced even if only part of it is relevant to the dispute at hand; however, other parts of the document may be privileged or otherwise not relevant to the dispute. In such instances, a reviewer may redact portions of a document that should be hidden from an opposing party so the documents produced will have those portions redacted from the opposing party's view. A review can specify that a document should have lines 60-66 redacted. In the documents finally produced, all related documents to the redacted document will also have lines 60-66 redacted.

Sometimes, a document may undergo reviews several times. As a result, one or more types of review information—including comments, annotations, tags, and redaction information—from different times—may be associated with the document. Each time a document is reviewed, additional review content is associated with the document. These review content is ultimately aggregated to specify a final version of a document view produced for an opposing party. A complete history of the tagging process may also be maintained and incorporated as part of the review content as part of the ultimately produced set of documents.

To maintain integrity of the reviewed document, each instance of review content may be kept separate from the document, according to an embodiment. When one adds a review information (i.e. a comment, annotation, tag, redacting information, etc.) to a document, the document is not altered. Instead, a comment is create and stored outside the file and linked back to the document. Depending on the embodiments, the comment may be stored in a separate file or location or even database. For ease of retrieving review contents associated with a document, an index of all the review content may be associated with each document. The index may be stored in a separate file, location or database, depending on the embodiment.

Another aspect of the current invention is enabling various add-on review content to be associated with one master or pivot document and later be propagated to one or more related documents. In this manner, a reviewer is not be required to inefficiently review each of the several instances of a related set of documents. Instead only a master or pivot document from a related set of documents needs to be reviewed.

In general, the set of documents that have to be reviewed during an discovery is referred to as a review set. In the embodiment, a review would only need to review a set of master or pivot documents associated with the review set.

After a reviewer reviews one master or pivot document, review content can be propagated from the master or pivot document to the rest of the set of related documents. Flexibility is provided by allowing additional review content to be added to specific instances of each of the related documents.

Additional flexibility is provided in the way by which review comment is propagated through the related documents is important.

In some cases, a certain part of the review content is propagated to all related documents. In other cases, a part of the review content is propagated only to a subset of the related documents. In yet other cases, new review content may be associated with one or more of the related documents without the review content being associated with the master or pivot document. Therefore while the review content associated with each of a set of related documents should be similar, the current embodiment also allows individual documents to be associated with unique versions of review content also.

After a master or pivot document of a set of related documents is reviewed, review content associated with the master or pivot is replicated to the rest of the set of documents. As depicted in FIG. 2, this step is shown as the re-duplicating stage (step 2040). Re-duplication is a process by which after a master or pivot document has been properly reviewed, the review or add-on information associated with the master or pivot document is propagated and associated with the rest of the set of related documents. The review content is ultimately aggregated to specify a final version of a document view produced for an opposing party.

Depending on the specific embodiments, while review content is typically propagated to all related documents, some review content are tailored to specific documents and are not propagated. As an example, consider review content that is attached to a specific document copy but not to the master or pivot copy. In the example, the master or pivot copy is a published market brochure that has been cleared for production while the version of the specific document copy is that retrieved from the private email box of the vice president of marketing. In the specific document, the vice president may have added sensitive comments regarding the company's strategic marketing decisions not relevant to the case. According to an embodiment, a reviewer may redact the additional comments by the vice president. The redaction applies only to the specific document and not to other copies such as the master or pivot copy. Therefore, the redaction information is not propagated or applied to any of the other copies in the related set of documents.

In step 2050, electronically stored information may be delivered to various recipients representing an opposing party, including law firms, corporate legal departments, service providers, etc. Production can involve delivering electronically stored information for use in other systems including automated litigation support system, web-based repository, etc. Production can also involve delivering electronically stored information on various media including CD, DVD, tape, hard drive, portable storage device, paper, other. Depending on the specific embodiment, all the original source locations and custodians are maintained and preserved for each document produced. In case there are issues with the produced documents and the original source needs to be retrieved, the original documents can be retrieved efficiently.

Figure 3:
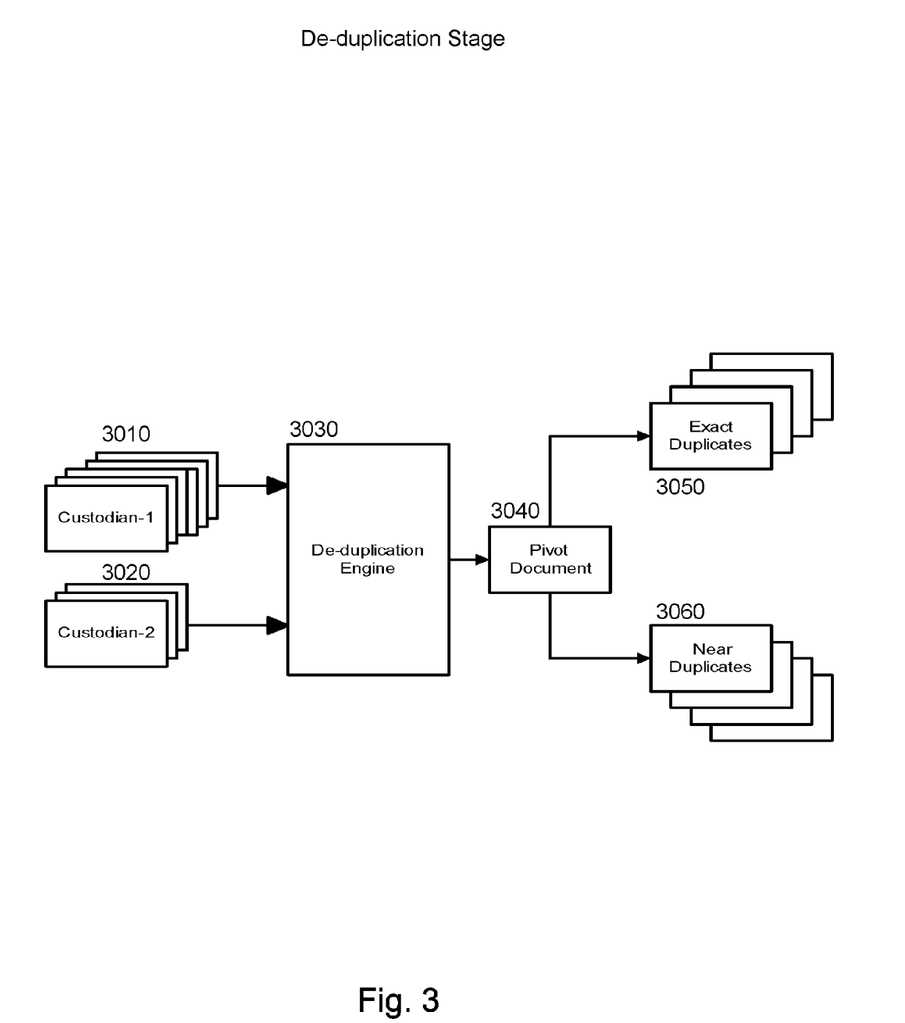
FIG. 3 is a simplified illustration showing the de-duplication of a set of documents according to an embodiment of the invention.

FIG. 3 is a simplified illustration showing the de-duplication of a set of documents according to an embodiment of the invention. On the left is depicted two sets of documents (3010 and 3020) belonging to two custodians. A custodian is a person or entity that owns or controls access to a set of electronic documents within an enterprise. A de-duplication engine 3030 processes documents 3010 and 3020 to organize documents 3010 and 3020 into a master or pivot document 3040, a set of exact-duplicate documents 3050, and a set of near-duplicate documents 3060. The set of exact duplicates 3050 may include files from both custodian 1 and custodian 2. Similarly, the set of near duplicates 3060 may include files from both custodian 1 and custodian 2.

Examples of exact-duplicates include exact copies of a file kept in several locations by several users. Examples of near-duplicate files include files that are almost identical to each other except for differences meta information, minor formatting changes, or actual formats used to store the files. Examples of near-duplicate files may include a document attached to an email relative to an original document. In this example, the document attached and later saved is identical to the sender's document except for, in one embodiment, the creation or modification dates. Two copies of an email, one original copy, and one forwarded to another person may also be considered near duplicates. In this case, the forwarded email may contain much of the same content as the original except for minor formatting changes and perhaps the addition of a new header and some description text. Examples of files saved in different formats include files saved in differing formats such as word format and pdf format; these may also be regarded as near duplicate files.

Figure 4A:
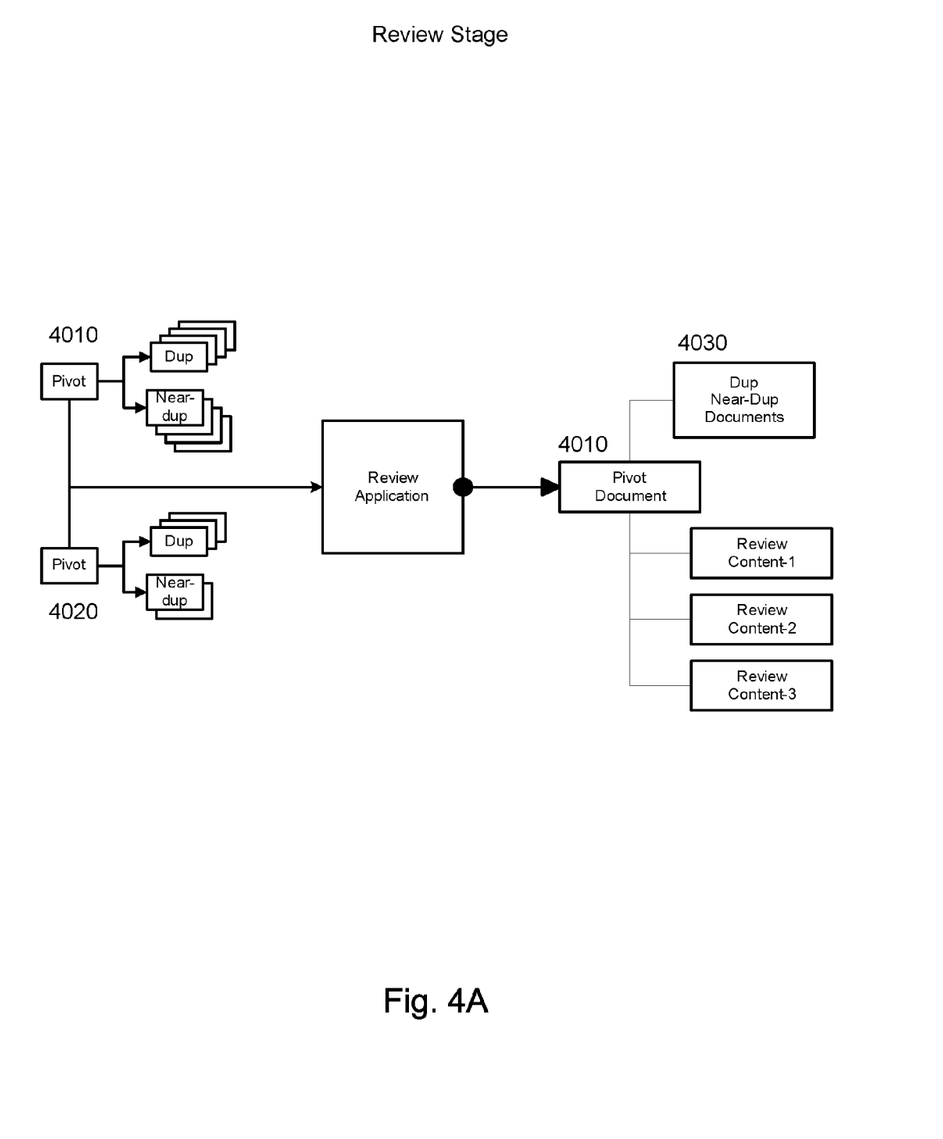
FIG. 4A is a simplified illustration showing the reviewing of a related set of documents.

FIG. 4A is a simplified illustration showing the reviewing of a related set of documents. In the example, two sets of related documents including two master or pivot documents 4010 and 4020 are reviewed. To review one of the related set of documents, a reviewer selects one of the sets of documents for review. Pivot document 4010 from the selected set is then selected for review. The review process allows a reviewer to add and associate various review content with pivot document 4010. Review comment such as annotation, comment, tag, and redacting information can be added and associated with pivot document 4010.

As a result of the review process, review content including Review Content-1, Review Content-2, and Review Content-3 is created and associated with master and pivot document 4010. According to an embodiment, the intent is that later, the review content will be propagated to each of the documents in the near duplicate set of documents 4030 associated with master and pivot document 4010. According to another embodiment, it is not required that all review contents be propagated. According to one embodiment, only Review Content-1 and review Content-2 are propagated to each of the duplicate and near-duplicate documents 4030 while Review Content-3 is not propagated to any of the duplicate and near-duplicate documents 4030.

Figure 4B:
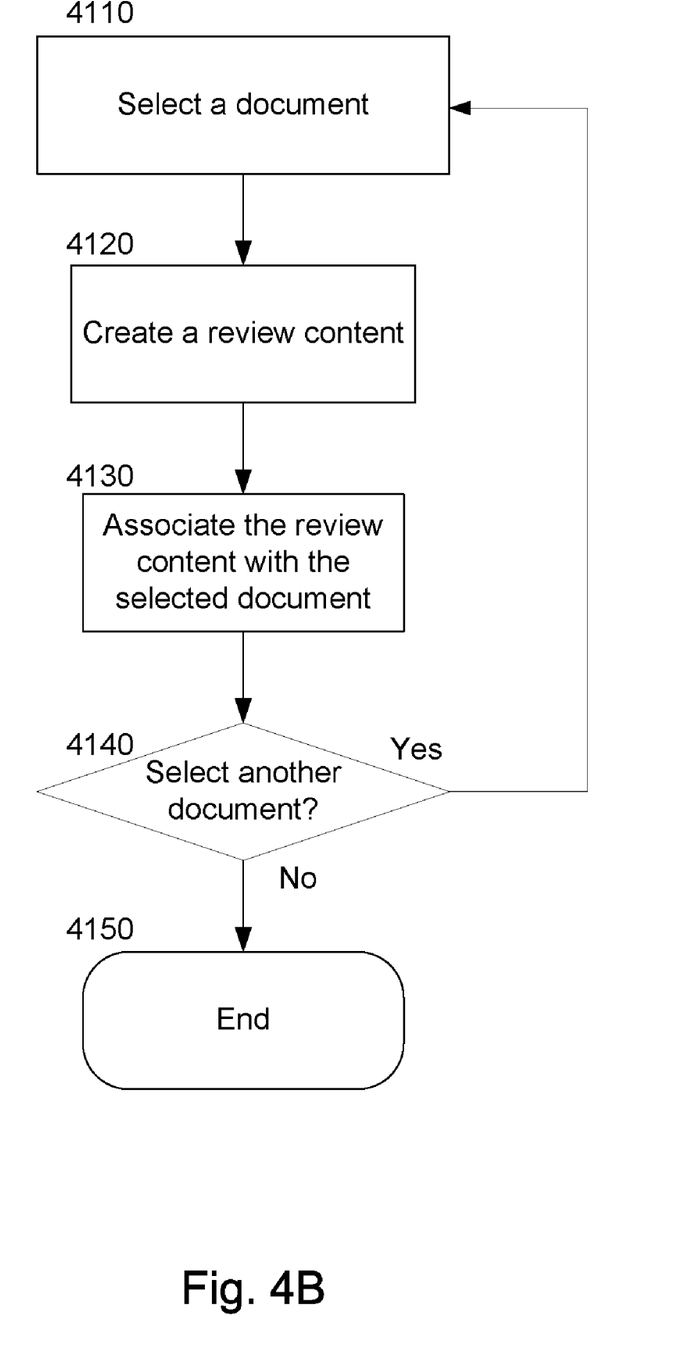
FIG. 4B is a simplified illustration showing a technique for adding and associating a review content with a document.

FIG. 4B is a simplified illustration showing a technique for adding and associating a review content with a document. The process starts with selection of a document for review (step 4110). Next, a reviewer creates new review content for the document (step 4120). The types of content created can vary. In some cases, a reviewer may create text or other annotation information to be associated with the document. Tags may also be created and associated with documents. According to an embodiment, a reviewer may select tags to mark otherwise flag documents so they can be organized or made searchable under those tags. A reviewer may also redact parts of a document by creating redacting information to be associated with the document.

In step 4130, review content including one or more of the above information is associated with the document. Typically, reviewers may associate review content only with the master or pivot document. Later, during de-duplication, the review content can be propagated to each of the exact-duplicate and near-duplicate documents. Reviewers may however also create review contents to be associated directly with documents other than master or pivot documents. Depending on the embodiments, the reviewer may specify whether for each specific review content whether the specific review content is to be propagated to all related documents, to specific related documents, or not to be propagated at all. Depending on that information, the review content be propagated to all related documents, to specific related documents, or not to be propagated at all. Step 4140 provides an opportunity for a reviewer to decide whether to select another document for review. Depending on the specific embodiments, another document selected for review may be another pivot or master document or any document from any of other related sets of documents.

Figure 5A:
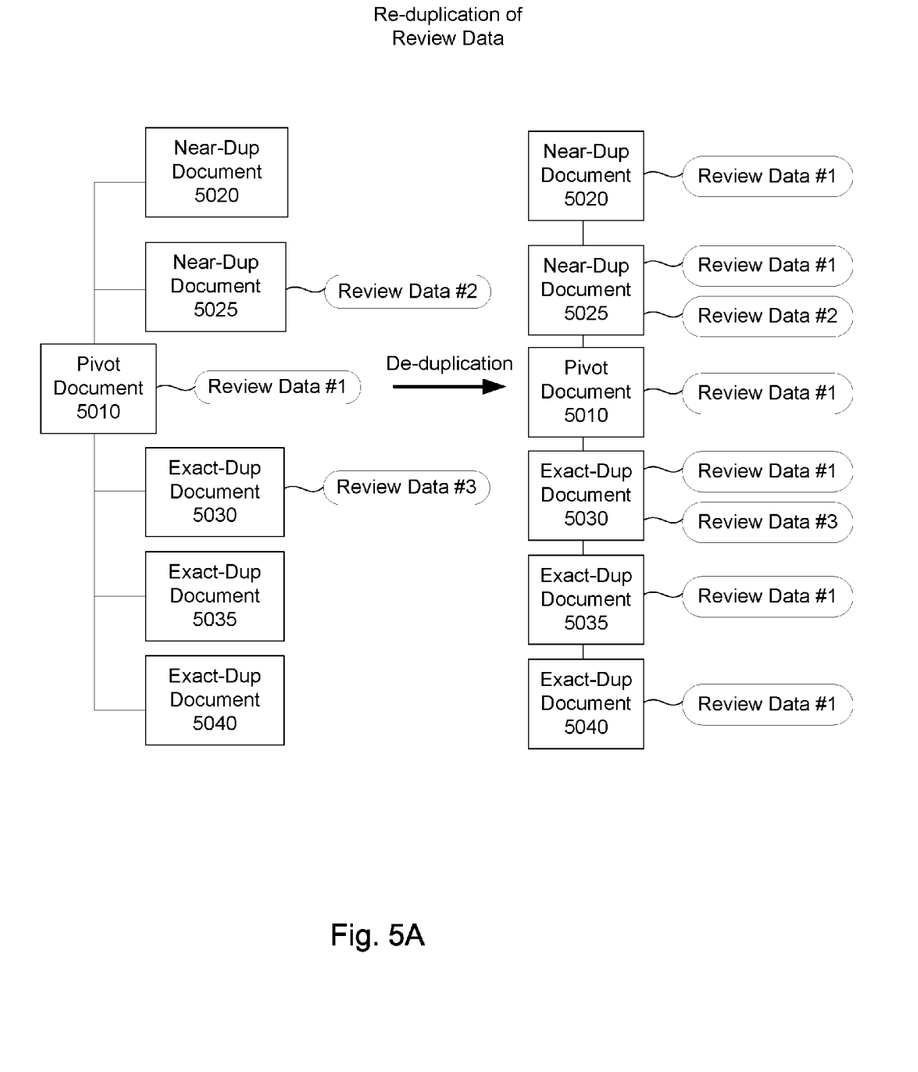
FIG. 5A is a simplified illustration showing a de-duplication process as applied to one master or pivot document.

FIG. 5A is a simplified illustration showing a de-duplication process as applied to one master or pivot document. As illustrated on the left side of the figure, a pivot or master document 5010 is associated with a set of near-duplicate documents 5020 and 5025 and a set of exact-duplicate documents 5030, 5035, and 5040. In the example, a review data #1 is associated with master or pivot document 5010; a review data #2 is associated near-duplicate document 5025; and a review data #3 is associated with exact-duplicate document 5030. According to the embodiment, upon de-duplication, review data #1 is propagated to the rest of the related set of documents—including, in this example, near-duplicate documents 5020 and 5025 exact-duplicate documents 5030, 5035, and 5040. In this example, it has been specified that neither review data #2 nor review data #3 is to be propagated. Consequently, in the final set of documents created, review data #2 is only associated with document 5025 and review data #3 is only associated with document 5030 upon de-duplication.

Figure 5B:
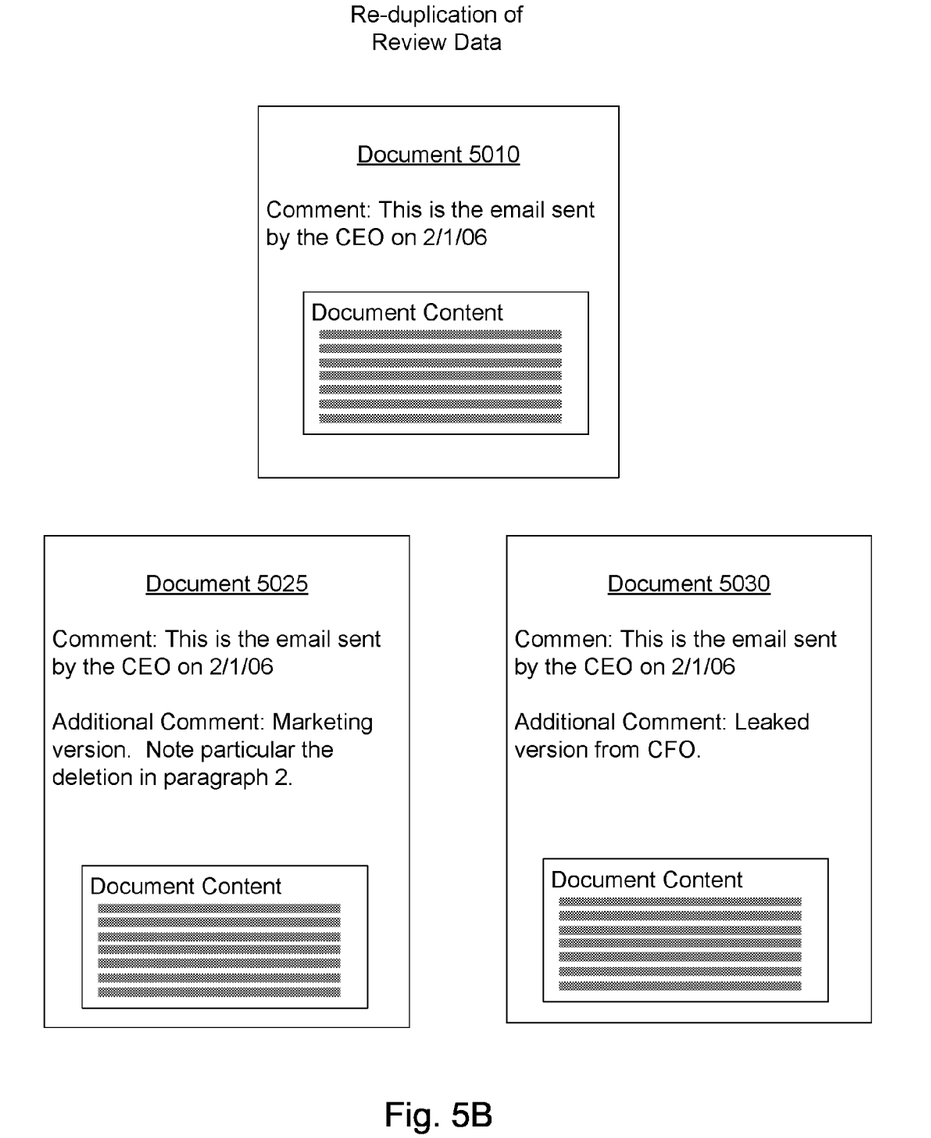
FIG. 5B is a simplified illustration of an embodiment of a result of the de-duplication process.

FIG. 5B is a simplified illustration of an embodiment of a result of the de-duplication process shown in FIG. 5A. According to the embodiment, the comment "This is the email sent by the CEO on Feb. 1, 2006" is specified by review data #1. Because this data is propagated to each of the documents related to pivot or master document 5010, document 5010, document 5025, and document 5030—among others (not shown)—all are associated with the document. The comment "Marketing version. Note particular the deletion in paragraph 2" is specified by review data #2. Because this data is set not to be propagated to any other documents, the comments are associated with only document 5025. The comment "Leaked version from CFO" is specified by review data #3. Because this data is set not to be propagated to any other documents, the comments are associated with only document 5030.

As depicted in FIGS. 5A and 5B, in the example, the document content of 5010 and 5030 are the same because document 5030 is an exact duplicate of document 5010. The document contents of documents 5010 and 5025 are slightly different because document 5025 is only a near duplicate of document 5010. According to the embodiment, the document contents of near duplicate documents 5010 and 5025 may be the exactly same except for the deletion of paragraph 2 in document 5025.

Figure 5C:
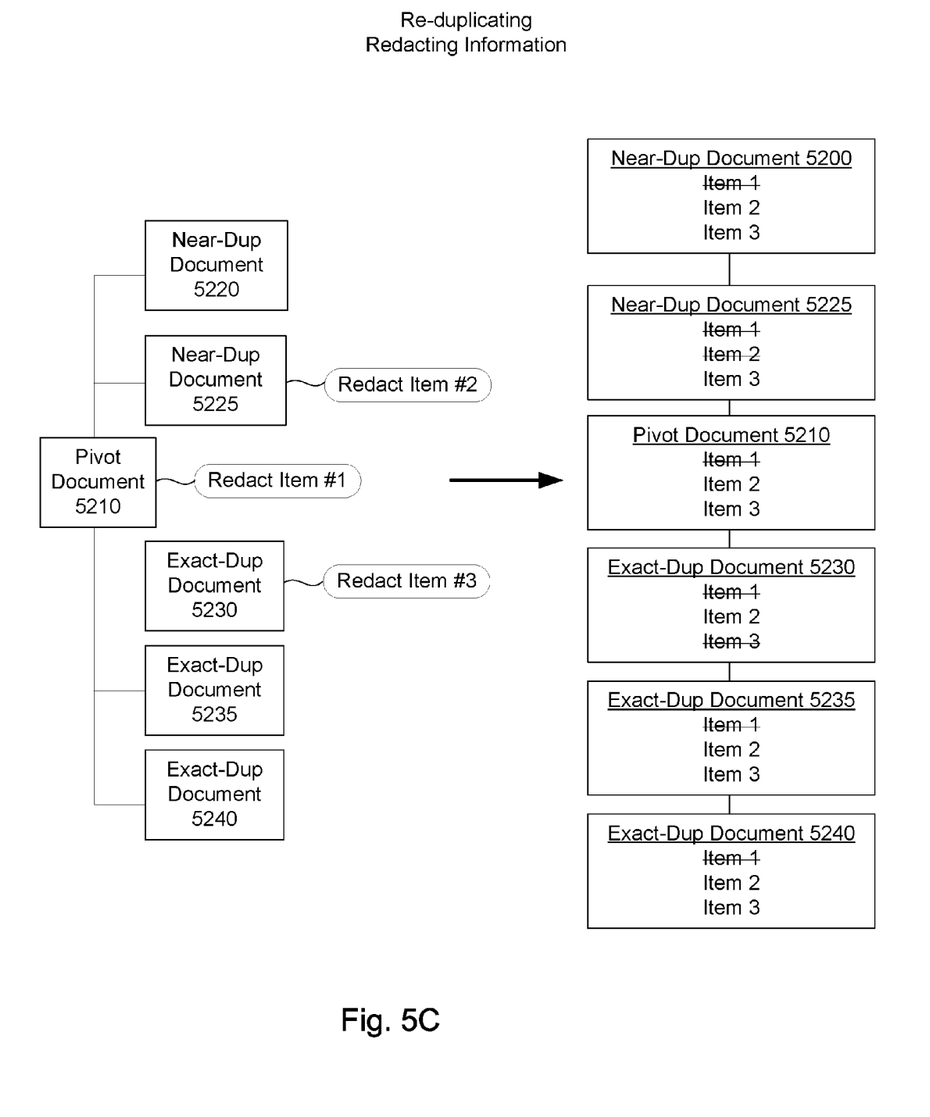
FIG. 5C is a simplified illustration showing another de-duplication process as applied to one master or pivot document.

FIG. 5C is a simplified illustration showing another de-duplication process as applied to one master or pivot document. As illustrated on the left side of the figure, a pivot or master document 5210 is grouped with a set of near-duplicate documents 5220 and 5225 and a set of exact-duplicate documents 5230, 5235, and 5240. In the example, a review data specifying the redacting of item #1 is associated with master or pivot document 5210; a review data #2 specifying the redacting of item #2 is associated near-duplicate document 5225; and a review data #3 specifying the redacting of item #3 is associated with exact-duplicate document 5230. According to the embodiment, upon de-duplication, information specifying redaction of item #1 is propagated to the rest of the related set of documents—specifically, near-duplicate documents 5220 and 5225 exact-duplicate documents 5230, 5235, and 5240. According to the embodiment, neither redaction of item #2 nor redaction of item #3 are to be propagated; thus neither information specifying redaction of item #2 nor information specifying redaction of item #3 are propagated.

On the right side of FIG. 5C is shown an illustration of a result of a de-duplication process. According to the embodiment, item #1 in all of the related documents is redacted because information item #1 is redacted in Pivot or master Document 5210, where information instruction item #1 to be redacted is specified to be propagated to all related documents. Item #2 is redacted is only redacted in document 5225 because item #2 is redacted in document 5225, where information instructing item #2 to be redacted is specified to be associated with only document 5225 and thus not propagated to any other of the related documents. Item #3 is redacted only in document 5230 because item #3 is redacted in document 5230, where information instructing item #3 to be redacted is specified to be associated only with document 5230 and thus not propagated to any other of the related documents.

In general, according to the embodiments, the documents that are produced to an opposing party after re-duplication can appear in a number of formats. According to an embodiment, the produced documents can presented in pdf format. According to another embodiment, the produced documents can presented in native format including word and excel formats. In the production documents, comments and annotations may appear to a margin with tracing marks and labels to the main contents as appropriate. Redacted sections can appear as sections with black mark covering up sections that have been marked for redaction.

According to an embodiment, tag information can be adapted to categorize the documents. The documents can be organized and accessed through a tree format for better navigation and access to the documents. The produced documents can also be rendered to be efficiently searchable in accordance with information contained in the tag information.

Review information such as comments, annotations, and tags can be stored on a xml file relating the appropriate files and the review information. Redaction, according to an embodiment, is produced in the generation of the pdfs. To maintain and prove integrity, data can be collected and preserved in the original native form and subsequently preserved within an eye toward content integrity. Depending on the specific embodiments, both content data as well as meta-data for the contents, such as the owner, last access time, last modified time and external name of the content data, can all be collected and preserved and produced with the final set of production documents. The produced documents can also be organized by custodians. Through the process, the custodians associated with the electronic documents can also be modified as needed. The final production documents can be stored in a disc such as a DVD disc.

Figure 6:
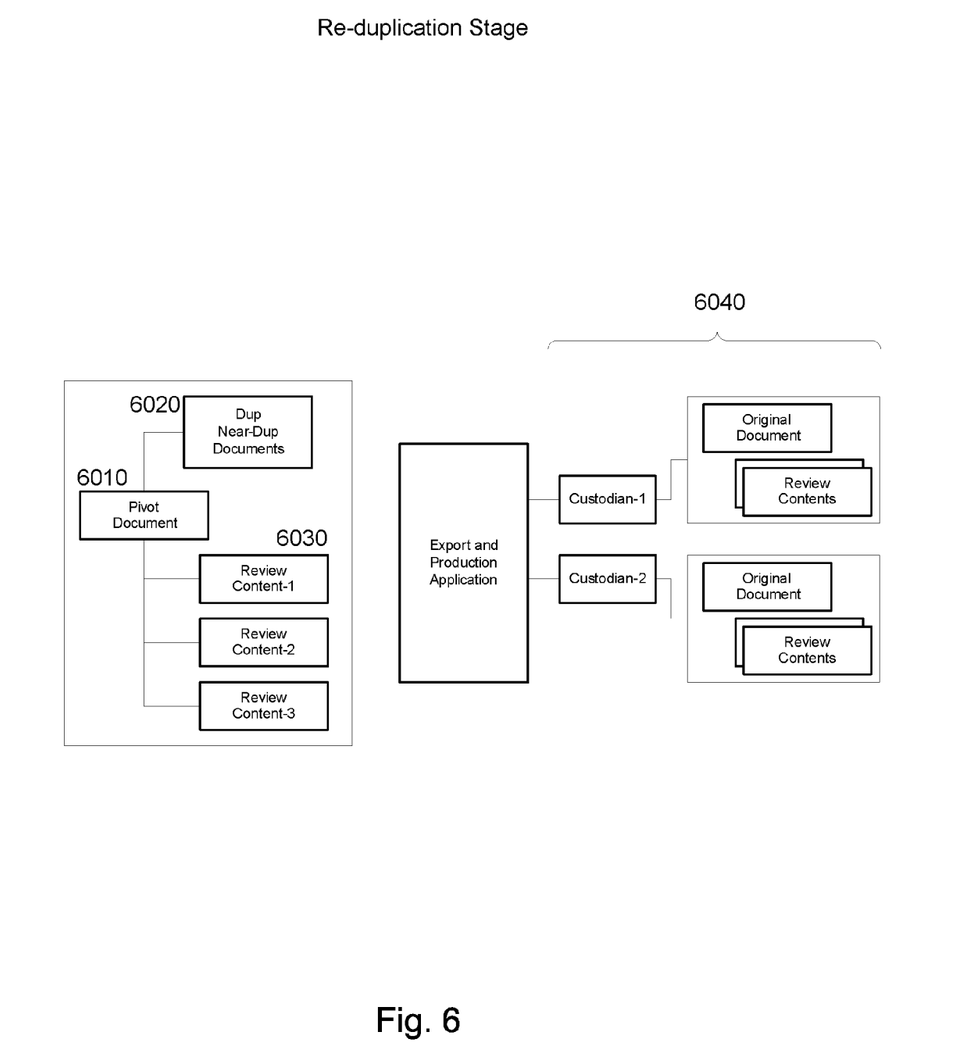
FIG. 6 is a simplified illustration showing a technique for producing a document.

FIG. 6 is a simplified illustration showing a technique for producing a document. A pivot document 6010 is related to a group of documents 6020 and is associated with several review content 6030. Upon de-duplication and processing, a group of electronic documents are produced. The produced documents can be indexed and organized to be viewed through one of several organizational views and to be searched by one of several keys. According to one embodiment, the documents can be organized and viewed by the original Custodians. Upon selecting an original Custodian, a list of non-duplicated documents is displayed. When a document is selected, the pivot document for that document is show with the original content referenced. Where appropriate, the content is marked up in accordance with all the review content information associated with the document.

Figure 7:
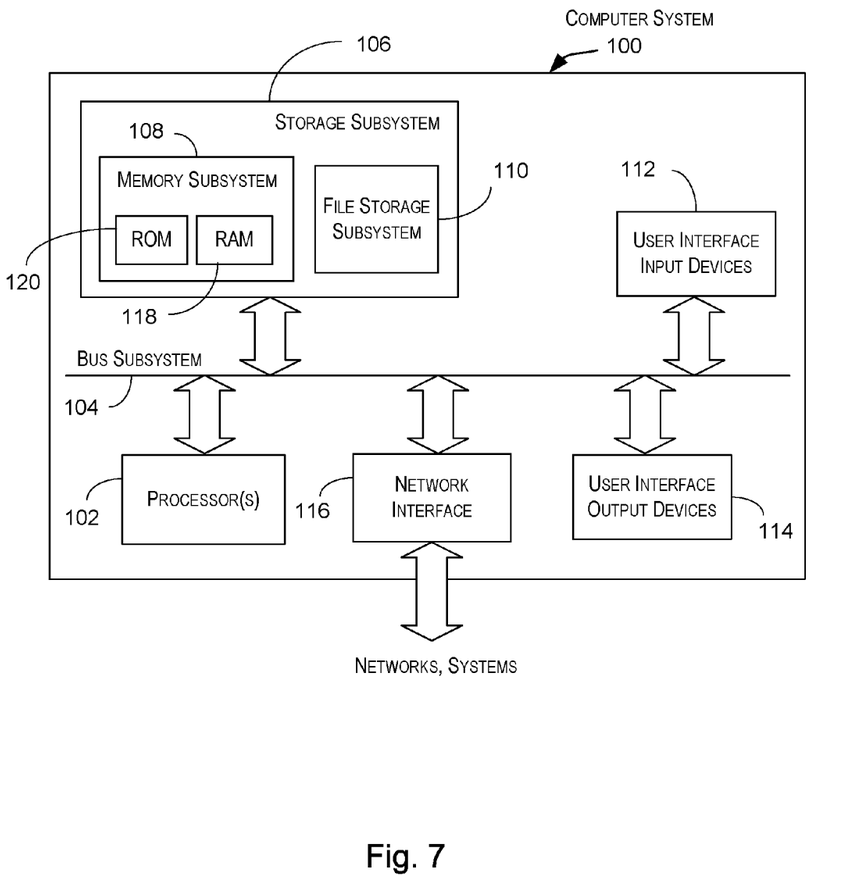
FIG. 7 is a simplified block diagram of a computer system 100 that may be used to practice an embodiment of the various inventions described in this application.

FIG. 7 is a simplified block diagram of a computer system 100 that may be used to practice an embodiment of the various inventions described in this application. As shown in FIG. 7, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100.

Storage subsystem 106 may be configured to store the basic programming and data constructs that provide the functionality of the present invention. Software (code modules or instructions) that provides the functionality of the present invention may be stored in storage subsystem 106. These software modules or instructions may be executed by processor(s) 102. Storage subsystem 106 may also provide a repository for storing data used in accordance with the present invention. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, a server or any other data processing system. Due to the ever-changing nature of computers and networks, the description of computer system 100 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method for producing and organizing electronically stored information, the method comprising:

identifying, with one or more processors associated with one or more computer systems, a plurality of documents from the electronically stored information as satisfying similarity criteria;

identifying, with the one or more processors associated with one or more computer systems, a first document in the plurality of documents as a pivot document for the plurality of documents that satisfy the similarity criteria, the pivot document being representative of the plurality of documents that satisfy the similarity criteria;

generating, with the one or more processors associated with one or more computer systems, information configured to display a graphical user interface that enables users of the graphical user interface to associate review content with each pivot document in a collection of pivot documents visually represented in the graphical user interface;

receiving, at the one or more computer systems, the review content that is indicative of textual information or one or more annotations provided by a user of the graphical user interface;

associating, with the one or more processors associated with one or more computer systems, the review content indicative of the textual information or the one or more annotations with the pivot document; and propagating, with the one or more processors associated with one or more computer systems, the review content indicative of the textual information or the one or more annotations from the pivot document to one or more documents in the plurality of documents that satisfy the similarity criteria.

2. The method of claim 1, wherein propagating the review content indicative of the textual information or the one or more annotations from the pivot document to the one or more documents in the plurality of documents that satisfy the similarity criteria comprises associating the review content indicative of the textual information or the one or more annotations with the one or more documents in the plurality of documents that satisfy the similarity criteria.

3. The method of claim 1 further comprising marking up each of the one or more documents in accordance with the review information.

4. The method of claim 1 wherein the review content indicative of the textual information or the one or more annotations includes one or more comments.

5. The method of claim 1 wherein the review content indicative of the textual information or the one or more annotations includes an annotations information.

6. The method of claim 1 wherein the review content indicative of the textual information or the one or more annotations includes one or more tags.

7. The method of claim 1 further comprising:
associating additional review content indicative of textual information or one or more annotations with a second document in the plurality of documents that satisfy the similarity criteria.

8. The method of claim 7 further comprising presenting the second document, wherein the second document is marked up in accordance with the review content and the additional review content.

9. The method of claim 1 further comprising organizing the plurality of documents in accordance with the review content, wherein the plurality of documents is adapted to be navigated in accordance to the review content.

10. The method of claim 1 further comprising organizing the plurality of documents in accordance with the review content, wherein the plurality of documents is adapted to be searched in accordance to the review content.

11. The method of claim 1, wherein identifying the plurality of documents as satisfying the similarity criteria comprises identifying a plurality of near-duplicate documents, wherein each of the plurality of near-duplicate documents is a closely related copy of the pivot document.

12. The method of claim 1, wherein identifying the plurality of documents as satisfying the similarity criteria comprises identifying a plurality of exact-duplicate documents, wherein each of the plurality of exact-duplicate documents is an exact copy of the pivot document.

13. The method of claim 1 further comprising producing the electronically stored information to an opposing counsel.

14. A non-transitory computer-readable medium storing instructions which when executed by one or more processors cause the processors to perform a method for producing and organizing electronically stored information, the method comprising:
identifying a plurality of documents from the electronically stored information as satisfying similarity criteria;
identifying a first document in the plurality of documents as a pivot document for the plurality of documents that satisfy the similarity criteria, the pivot document being representative of the plurality of documents that satisfy the similarity criteria;
generating information configured to display a graphical user interface that enables users of the graphical user interface to associate review content with each pivot document in a collection of pivot documents visually represented in the graphical user interface;
receiving the review content that is indicative of textual information or one or more annotations provided by a user of the graphical user interface;
associating the review content indicative of the textual information or the one or more annotations with the pivot document; and
propagating the review information content indicative of the textual information or the one or more annotations from the pivot document to one or more documents in the plurality of documents that satisfy the similarity criteria.

15. The non-transitory computer-readable medium of claim 14, wherein propagating the review content indicative of the textual information or the one or more annotations from the pivot document to the one or more documents in the plurality of documents that satisfy the similarity criteria comprises associating the review content indicative of the textual information or the one or more annotations with the one or more documents in the plurality of documents that satisfy the similarity criteria.

16. The non-transitory computer-readable medium of claim 14 wherein the method further comprises marking up each of the one or more documents in accordance with the review information.

17. The non-transitory computer-readable medium of claim 14 wherein the review content indicative of the textual information or the one or more annotations includes one or more comments.

18. The non-transitory computer-readable medium of claim 14 wherein the review content indicative of the textual information or the one or more annotations includes an annotations information.

19. The non-transitory computer-readable medium of claim 14 wherein the review content indicative of the textual information or the one or more annotations includes one or more tags.

20. The non-transitory computer-readable medium of claim 14, wherein the method further comprises:
associating additional review content indicative of textual information or one or more annotations with a second document in the plurality of documents that satisfy the similarity criteria.

21. The non-transitory computer-readable medium of claim 20 wherein the method further comprises presenting the second document, wherein the second document is marked up in accordance with the review content and the additional review content.

22. The non-transitory computer-readable medium of claim 14 wherein the method further comprises organizing the plurality of documents in accordance with the review content, wherein the plurality of documents is adapted to be navigated in accordance to the review content.

23. The non-transitory computer-readable medium of claim 14 wherein the method further comprises organizing the plurality of documents in accordance with the review content, wherein the plurality of documents is adapted to be searched in accordance to the review content.

24. The non-transitory computer-readable medium of claim 14, wherein identifying the plurality of documents as satisfying the similarity criteria comprises identifying a plurality of near-duplicate documents, wherein each of the plurality of near-duplicate documents is a closely related copy of the pivot document.

25. The non-transitory computer-readable medium of claim 14, wherein identifying the plurality of documents as satisfying the similarity criteria comprises identifying a plurality of exact-duplicate documents, wherein each of the plurality of exact-duplicate documents is an exact copy of the pivot document.

* * * * *